Nov. 21, 1961  B. W. TAYLOR  3,009,258
HISTOLOGICAL MANIFOLDS
Filed April 24, 1958  4 Sheets-Sheet 3

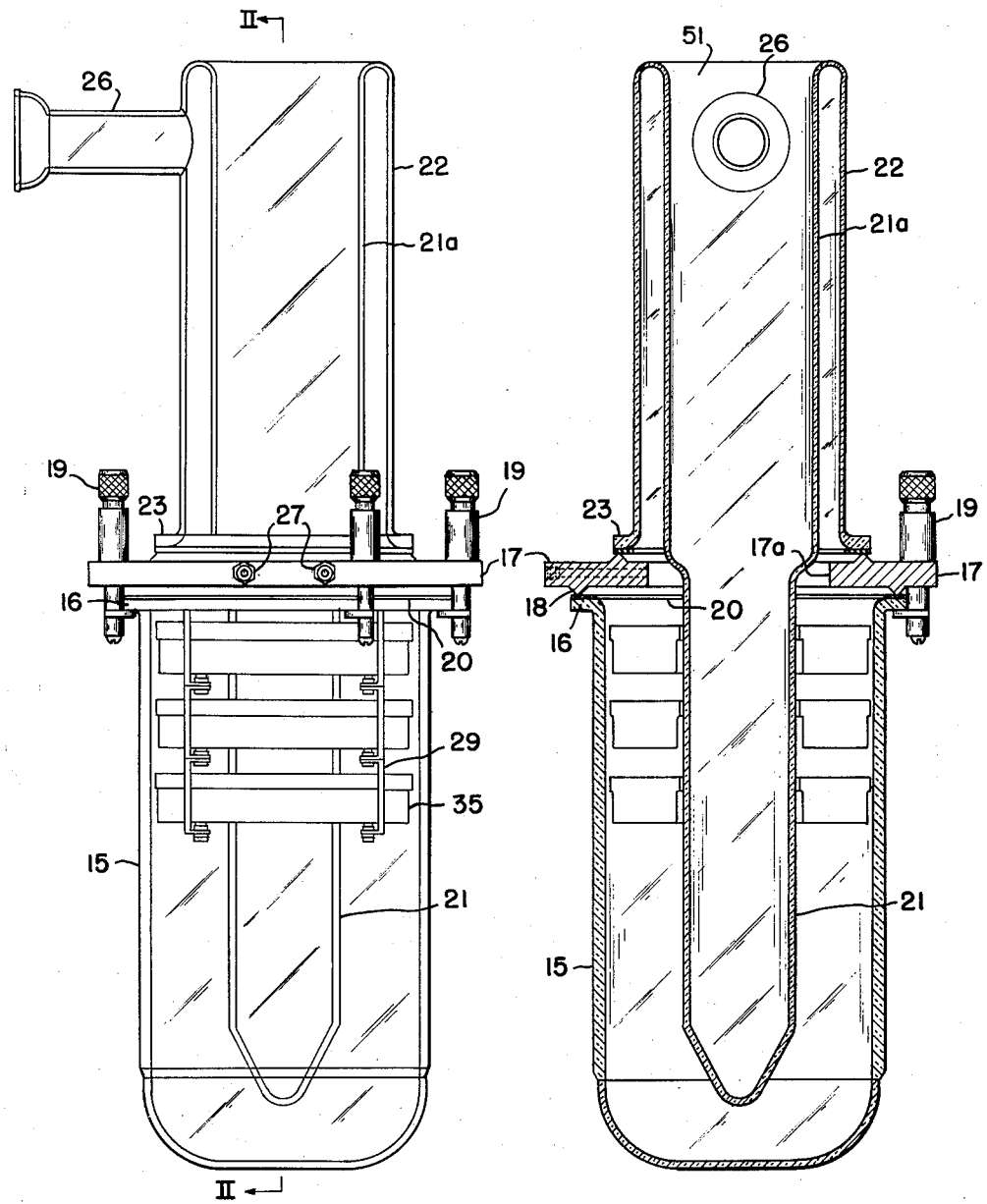

INVENTOR.
Billy W. Taylor
BY Webb, Mackey & Burden
HIS ATTORNEYS

Nov. 21, 1961  B. W. TAYLOR  3,009,258
HISTOLOGICAL MANIFOLDS
Filed April 24, 1958  4 Sheets-Sheet 4
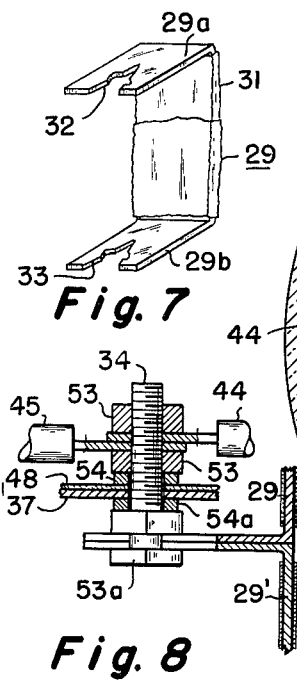
Fig. 7
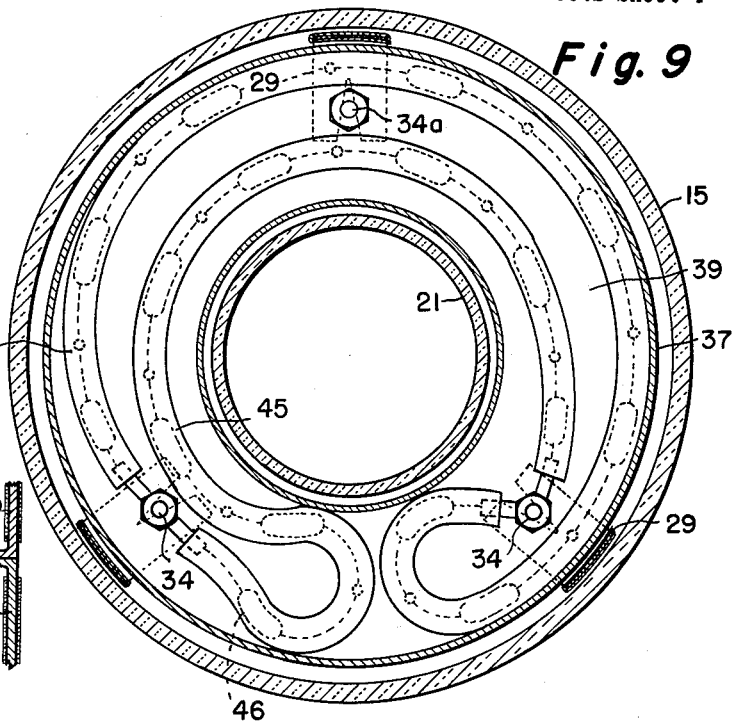
Fig. 9
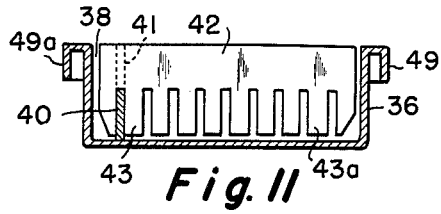
Fig. 8
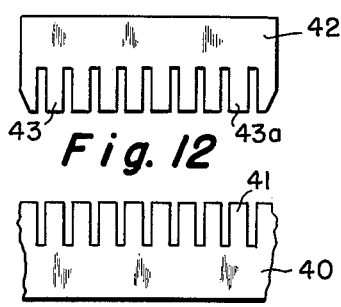
Fig. 11
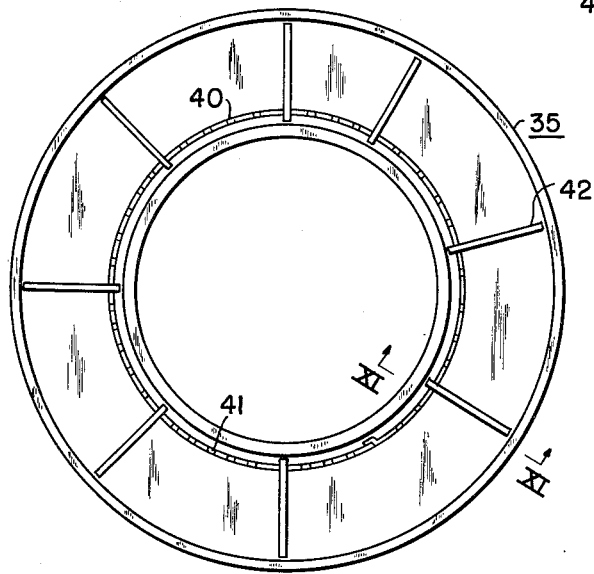
Fig. 10
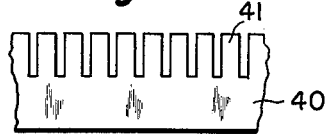
Fig. 12
Fig. 13
INVENTOR.
Billy W. Taylor
BY Webb, Mackey & Burden
HIS ATTORNEYS 3,009,258
HISTOLOGICAL MANIFOLDS
Billy W. Taylor, Pittsburgh, Pa., assignor to Fisher Scientific Company, Pittsburgh, Pa., a corporation of Pennsylvania
Filed Apr. 24, 1958, Ser. No. 730,678
4 Claims. (Cl. 34—92)

This invention relates to histological manifolds for use in a freeze-drying apparatus, more particularly to an improved apparatus in which previously frozen histological specimens may be dried and embedded in wax.

A major problem of histologists and pathologists is the preservation of specimens of tissue as nearly as possible in their natural state, so that slight changes in structure or chemical organization can be detected and interpreted. Lyophilization, freeze-drying, is considered by many to be the best solution to this problem. In that process, tissues are frozen quickly and then dried and embedded in wax. The process has several advantages: there is no time for diffusion "artifacts" to form, and ice crystals are so small that they will not rupture cell membranes or distort the tissue structure.

My invention pertains to a histological manifold which is that part of a freeze-drying unit in which the tissues are held under a vacuum while the frozen moisture is sublimed from the tissues which are thereafter embedded in wax.

In a freeze-drying unit it is desirable that the histological manifold be capable of holding a large number of specimens of varying sizes. All the specimens should be subjected to the same physical conditions, free from contaminated air and moisture. A short path from the specimen to a cold finger is desirable. All moisture sublimed should be collected and prevented from returning to the specimens. Also, the specimen should be embedded in wax while in the same pure condition.

Figure 3:
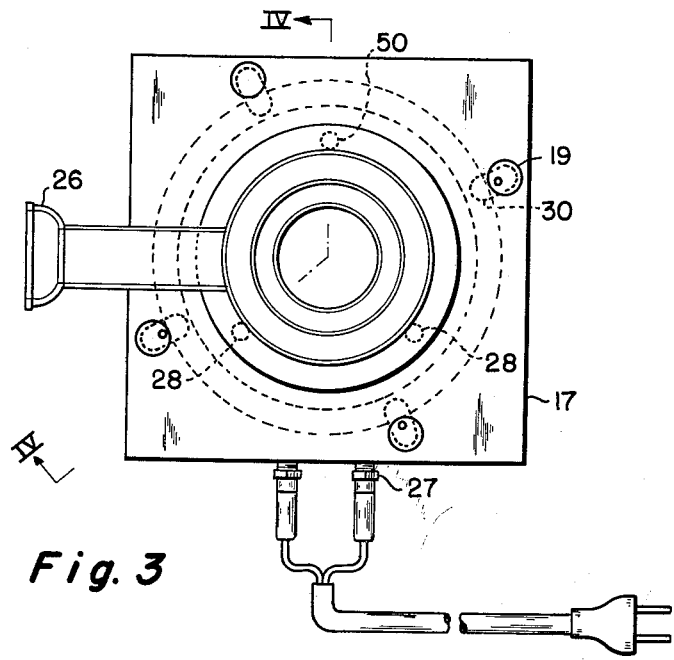
Figure 6:
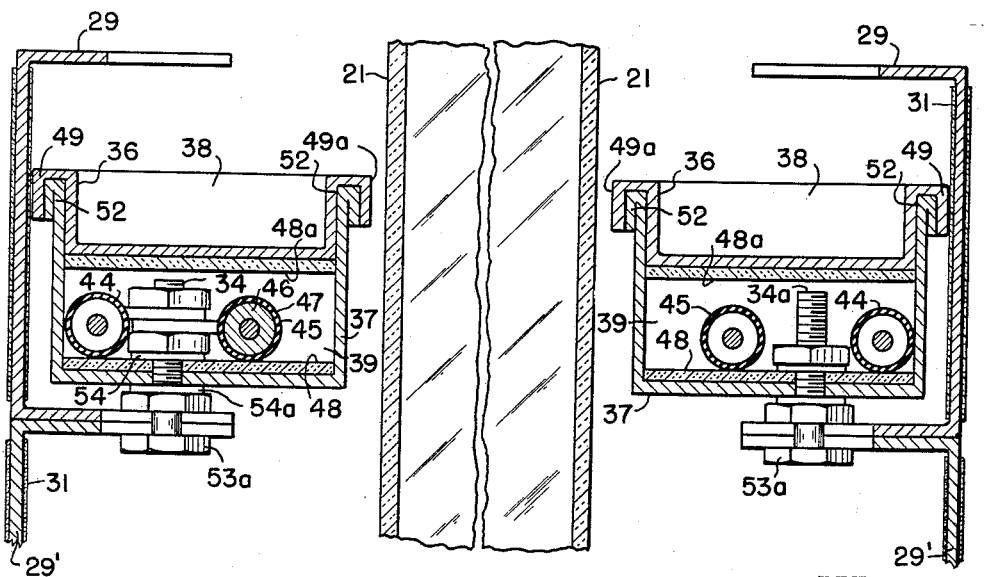
Figure 4:
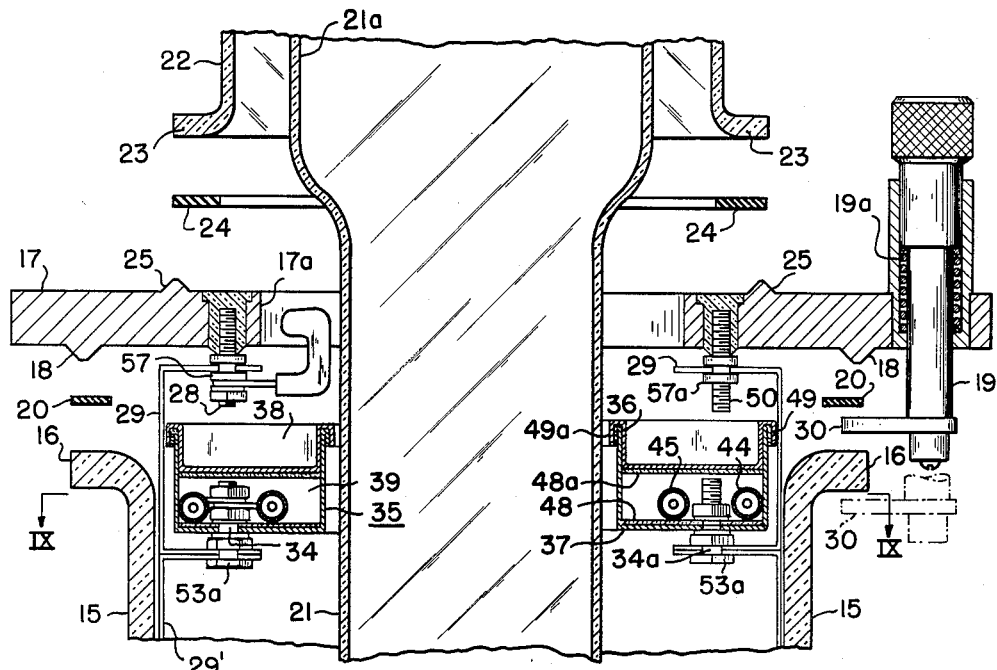
Figure 5:
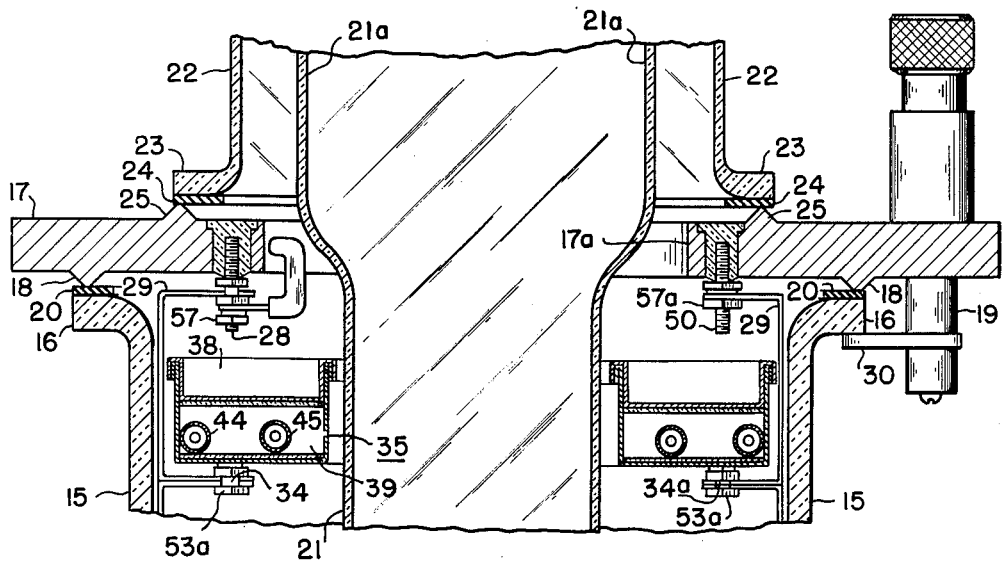

In the accompanying drawings, I have illustrated a present preferred embodiment of my invention wherein:

FIGURE 1 is an elevational view of the manifold;
FIGURE 2 is a section along the lines II—II of FIGURE 1;
FIGURE 3 is a plan view of the manifold;
FIGURE 4 is an expanded, partial section of the manifold taken on the lines IV—IV of FIGURE 3;
FIGURE 5 is an assembled view of the apparatus shown in FIGURE 4;
FIGURE 6 is a central vertical section of a tray for the manifold;
FIGURE 7 is a perspective view of a heater clip;
FIGURE 8 is a partial vertical section of a tissue tray bolt showing a heater clip post;
FIGURE 9 is a section on the lines IX—IX of FIGURE 4;
FIGURE 10 is a plan view of a tissue tray top;
FIGURE 11 is a section taken on the lines XI—XI of FIGURE 10;
FIGURE 12 is an elevation view of a divider finger; and
FIGURE 13 is a partial elevation view of a divider ring.

Referring to FIGURES 1 and 2, histological manifolds embodying my invention comprise a container in the form of a bell jar 15 having outwardly flared flanges 16 at its open end which provide a sealing seat. A square mounting plate 17, having a circular opening 17a and knife edge 18 on the bottom thereof, is fastened to the bell jar by four spring loaded clamps 19. Each clamp has a rectangular locking lug 30 which is movable into and out of engagement with the bottom surface of the flanged top of the bell jar 15 by rotating the clamp on its axis. When the locking lug is clear of the flange 16, the clamp 19 may be depressed against the pressure of the spring 19a to a position below the flanged edge of the bell jar and then rotated beneath the flange 16, thereby holding the bell jar to the mounting plate by the spring 19a. Both positions of the clamp are shown in FIGURE 4, the depressed position being shown in chain lines. A rubber ring gasket 20, between the knife edges 18 and the seat provided by the flared edges 16 of the bell jar, makes a tight seal between the bell jar 15 and the plate 17.

A cold finger 21 extends through the opening 17a in the mounting plate 17 to a position adjacent the bottom of the bell jar 15. An upper portion 21a of the cold finger extends above the opening and is surrounded by a sleeve 22 formed integral with the cold finger. The lower edge of the sleeve has an outwardly flared flange 23 which provides a sealing seat. A rubber gasket 24, an annular knife edge 25 on the top of the mounting plate, and the seat provide a tight seal between the plate 17 and the sleeve 22. Through an opening 51 in the top of the cold finger 21, a liquefied gas, such as liquid nitrogen, is fed into the cold finger, thereby providing a cold surface on which moisture sublimed from the specimens may collect.

When assembled to the mounting plate 17, the sleeve 22 and the bell jar 15 form a jacket enclosing all but the interior of the cold finger 21. This jacket is evacuated by means of a vacuum pump system connected to the sleeve by a glass socket 26.

The mounting plate 17 has jacks 27 for connection to a suitable source of electricity which lead to posts 28 carried on the plate (see FIGURES 3–5). Heater clips 29 (see FIGURE 7) are formed from a conductive material, such as bronze, by bending the ends of a strip of the material at right angles to the strip, thereby forming top and bottom plates 29a and 29b. The strip is insulated from the tray by tape 31. A slot 32 in the top plat 29a is adapted to engage an electric post 28. The bottom plate 29b is provided with a similar slot 33 which is adapted to engage an electric post 34 of a tissue tray as will be later described.

Tissue specimens are carried in annular trays 35. The annular configuration of the trays allows the cold finger 21 to extend through the center of the trays. A tray top 36 fits in a base 37, thus forming a tray having an upper compartment 38 and a lower compartment 39. The upper compartment 38 is used to hold the specimens to be dried and embedded in wax. It has a divider ring 40 (see FIGURE 13) which fits around the inner circumference of the tray top 36. The ring 40 has a series of teeth 41 which hold divider fingers 42 axially in the tray top by means of a tooth 43 in the divider finger which interlocks with the teeth 41 in the divider ring, as shown in FIGURE 11. Thereby, the tray top may be divided into a series of compartments of any desired size. The other teeth 43a of the divider finger provide passages through which an embedding wax, after being placed in the tray top in a solid form, may flow and be uniformly dispersed throughout the compartment 38 when it is melted.

The bottom of the tray base 37 holds a long heater element 44 and a short heater element 45 connected in parallel to each other and to the electric posts 34 extending through the bottom of the tray. The heater elements are formed by wiring small resistors 46 in series and enclosing them in a sleeve 47. A bottom ring 48 of asbestos separates the heater element from the bottom of the tray base and a top ring 48a of asbestos separates the heater element from the bottom of the tray top. The tray base 37 and the tray top 36 are held together after assembly by turning over an outer rim 49 and an inner rim 49a of the tray top over side walls 52 of the tray bottom.

The trays 35 are supported from the mounting plate 17 by three heater clips 29 by pressing the slots 32 in the top plates 29a of these clips around grooved nuts 57 and 57a which are fastened to posts 28 and 50 in the mounting plate 17 (see FIGURE 3) and by pressing the slots 33 in the bottom plates 29b of these clips around grooved nuts 53a which are fastened to posts 34 and 34a in the tissue trays (see FIGURE 9).

Two nuts 57 have a double groove. One groove provides a connection to jacks 27 while the second groove provides a connection for the top plate of clip 29. The third nut 57a has a single groove to hold the top plate of clip 29.

The heater elements 44 and 45 are secured to the electric posts 34 in the tray base by nuts 53 (see FIGURE 8), and are insulated from the tray base by a washer 54 and the tray base is insulated from the posts 34 by a washer 54a.

A second series of heater clips 29' (see FIGURES 4 and 8) are attached to posts 34 and 34a in the tray base. This second series of clips supports another tissue tray in the same manner as described above. In this manner as many trays as desired may be held in parallel in the bell jar.

The tissue is cut to the desired size, frozen, and placed in a cold tissue tray. The tissues may be sprinkled with crushed Dry Ice to keep them frozen while other trays are being prepared. When all the tissue trays are prepared and assembled in the freeze-drying unit, the bell jar is sealed to the mounting plate. The mechanical vacuum pump is started and liquid nitrogen is bled into the cold finger. When the pressure is 100 microns or less, a diffusion pump is started. The excess crushed Dry Ice on the tissues will quickly evaporate. The bell jar is maintained at about −30° C. for approximately one hour by means of a cold bath around it. This bath is then removed and the jar allowed to come to room temperature. This helps to speed up the drying process and allows the operator to observe the tissues while drying. This drying process varies with the size and type of tissue, and may range from 4 to 12 hours.

When drying is completed, the heaters in the trays are connected while the specimens are held under a vacuum and with the cold finger in place. The wax will melt in about 10 to 15 minutes and the tissues are completely embedded about 5 minutes thereafter. The heaters are then turned off and the system is return to atmospheric pressure.

It is readily seen that my invention improves both the quality and quantity of the work done by a freeze-drying unit. The tissue trays may be filled with a large number of specimens of varying sizes because several trays may be held in the manifold during one operation. After loading the trays the manifold bottom is easily positioned and firmly sealed by means of the spring loaded clamps. The jacket surrounding the cold finger may then be evacuated, thereby permitting all moisture from the frozen specimens to be sublimed on the cold finger which is positioned near to and equidistant from all the specimens. After the drying process has been completed the heaters in the individual trays are connected, melting the wax and allowing the specimens, which have been placed on top of the wax, to be embedded in the wax while the jacket is still evacuated. By embedding the specimens while under vacuum no moisture or other contamination can reach the specimen. The wax may be evenly distributed in the trays prior to start of the operation by connecting the heaters and allowing the melted wax to disperse evenly throughout the trays through the teeth in the divider fingers.

While I have described certain presently preferred embodiments of my invention it is to be understood that it may be otherwise embodied within the scope of the following claims.

I claim:

1. A histological manifold comprising: A container having an outwardly-flared flange at its open end which provides a sealing seat; a mounting plate having an opening therein; knife edges on the top and bottom surfaces of said plate around the periphery of the opening; locking lugs carried by said plate, said lugs holding the flange of said container to the knife edge on the bottom of said plate; posts carried by the mounting plate; means for connecting said posts to a source of electricity; heater clips attached to said posts; annular trays supported in said container by said clips for holding histological specimens and embedding wax therefor; heaters associated with each of said trays, said heaters being electrically connected by the clips to said posts; a cold finger fitting through the opening in said plate and through the hollow center portion of said trays and holding a liquified gas in close proximity to said trays; and a sleeve fitting around the upper portion of said cold finger, the upper end thereof being formed integral with said finger and the lower end having an outwardly-flared flange providing a sealing seat which rests on the knife edge on the top of said plate, said sleeve and said container forming a complete jacket for said cold finger in which a vacuum may be produced.

2. The combination defined in claim 1 in which each tray comprises an annular tray base fitting around said cold finger, a heater being held in said tray base, an annular tray top fitting in said tray base, binding posts fastened to said tray base, the heater clips engaging said posts whereby the clips support said tray and provide a conductor of electricity for said heater.

3. The combination defined in claim 2 in which the annular tray top has a divider ring fitting around the circumference of said tray top, said ring having a series of teeth, and at least one divider finger extending axially across said tray, said finger having a plurality of teeth, one tooth of said divider finger engaging a tooth of said divider ring.

4. The combination defined in claim 2 in which the heater clips comprise a flat strip of conductive material, and top and bottom plates extending substantially at right angles from said strip also formed of a conductive material, each of said plates having a slot engaging a binding post.

References Cited in the file of this patent

UNITED STATES PATENTS

| 1,327,011 | Arndt | Jan. 6, 1920 |
| 2,011,244 | Hannaford | Aug. 13, 1935 |
| 2,209,099 | Grueneklee | July 23, 1940 |
| 2,514,976 | Stivin | July 11, 1950 |
| 2,604,507 | Tyson | July 22, 1952 |

FOREIGN PATENTS

| 341,849 | Italy | July 13, 1936 |

OTHER REFERENCES

Studies on Cell Structure by the Freezing-Drying Method, The Anatomical Record, vol. 57, No. 3, pages 205–214, October 25, 1933.

High-Vacuum Condensation Drying of Proteins from the Frozen State, The Journal of Hygiene, vol. 39, No. 4, pages 413–445, July 1939.